US007417984B1

(12) United States Patent
Croak et al.

(10) Patent No.: US 7,417,984 B1
(45) Date of Patent: Aug. 26, 2008

(54) METHOD AND APPARATUS FOR CONFIGURING A COMPONENT

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 245 days.

(21) Appl. No.: 11/289,854

(22) Filed: Nov. 30, 2005

(51) Int. Cl.
*H04L 12/66* (2006.01)
(52) U.S. Cl. .................. 370/352; 370/353; 379/201.12
(58) Field of Classification Search ................. 713/152; 709/205–206, 221, 218, 226, 229; 379/201.02, 379/201.12; 370/352–356
See application file for complete search history.

(56) References Cited

U.S. PATENT DOCUMENTS

| | | | |
|---|---|---|---|
| 6,968,367 B1 * | 11/2005 | Vassar et al. ................. 709/219 |
| 7,139,263 B2 * | 11/2006 | Miller et al. ................. 370/352 |
| 2002/0069272 A1 * | 6/2002 | Kim et al. .................... 709/221 |
| 2002/0071540 A1 * | 6/2002 | Dworkin ................. 379/202.01 |

* cited by examiner

*Primary Examiner*—Suhan Ni

(57) ABSTRACT

A method and apparatus for configuring at least one component of a plurality of components in a communications network are described. In one embodiment, the at least one component is selected from a plurality of components, wherein the plurality of components is situated at a common location, such as server farm. Afterwards, the at least one component is configured to predominantly support a first network function that is a high availability function, while it is also configured to support at least a second network function with only a limited portion (e.g., a low percentage) of its total processing resources.

20 Claims, 4 Drawing Sheets

METHOD AND APPARATUS FOR CONFIGURING A COMPONENT

BACKGROUND OF THE INVENTION

1. Field of the Invention

Embodiments of the present invention generally relate to telecommunications systems and, more particularly, to a method and apparatus for configuring a component in a communications network, such as a packet network, e.g., a voice over internet protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

Components in a packet network infrastructure, e.g., a VoIP network infrastructure, are typically shared across numerous applications. Media servers, for example, may be required to support voice mail services, network announcements, and conferencing applications. These various applications possess different requirements for availability and reliability, and therefore place varying demands on a network component. Consequently, a network provider may desire to ensure that certain high availability applications and services are fully supported by the network regardless of network traffic conditions or demands.

Thus, there is a need in the art for a more effective method and apparatus for configuring a component to ensure that selected network applications and servers are supported.

SUMMARY OF THE INVENTION

In one embodiment, a method and apparatus for configuring at least one component of a plurality of components in a communications network are described. Specifically, the at least one component is selected from a plurality of components, wherein the plurality of components is situated at a common location, such as server farm. Afterwards, the at least one component is configured to predominantly support a first network function that is a high availability function, while it is also configured to support at least a second network function with only a limited portion (e.g., a low percentage) of its total processing resources.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
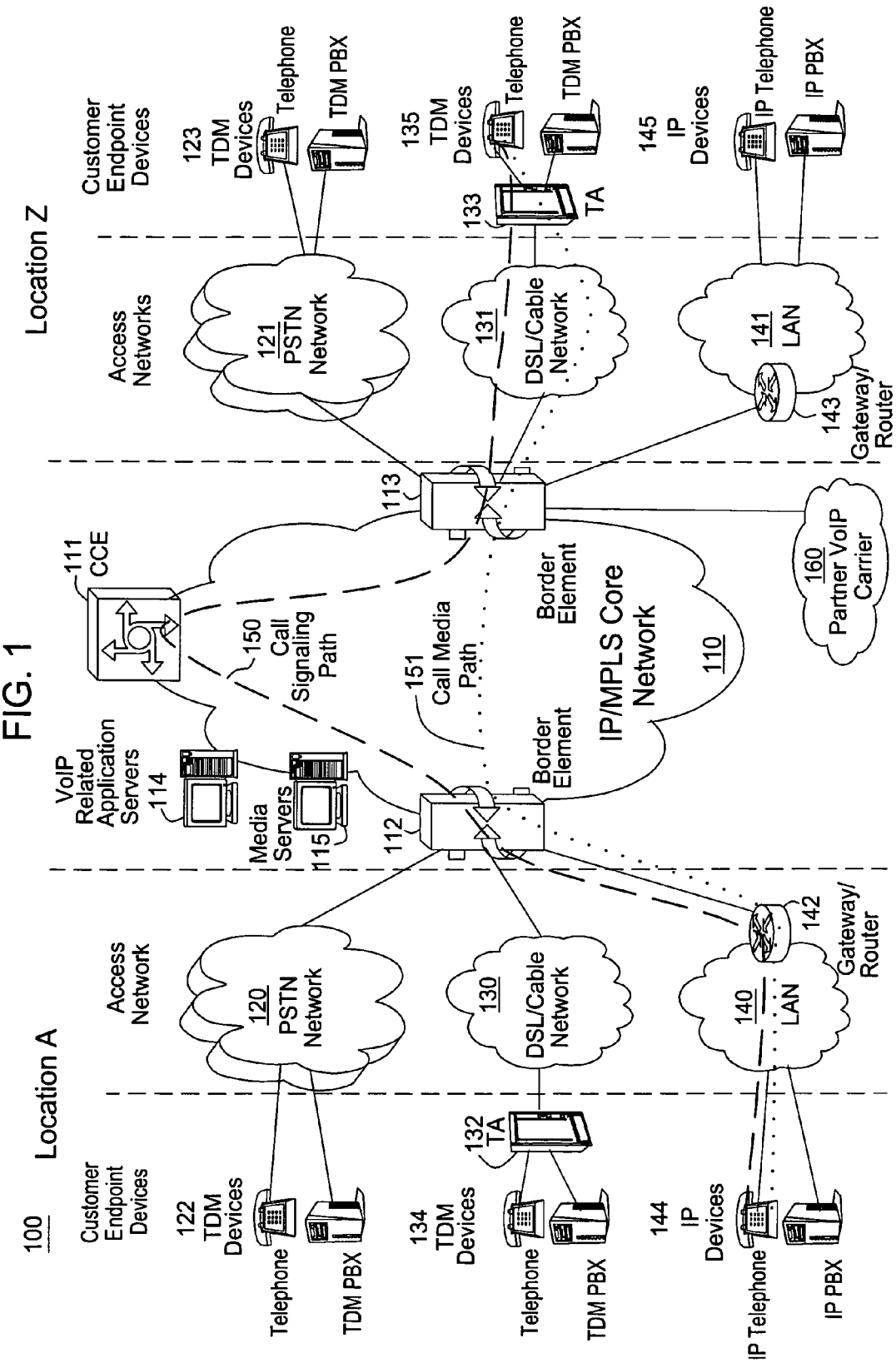
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
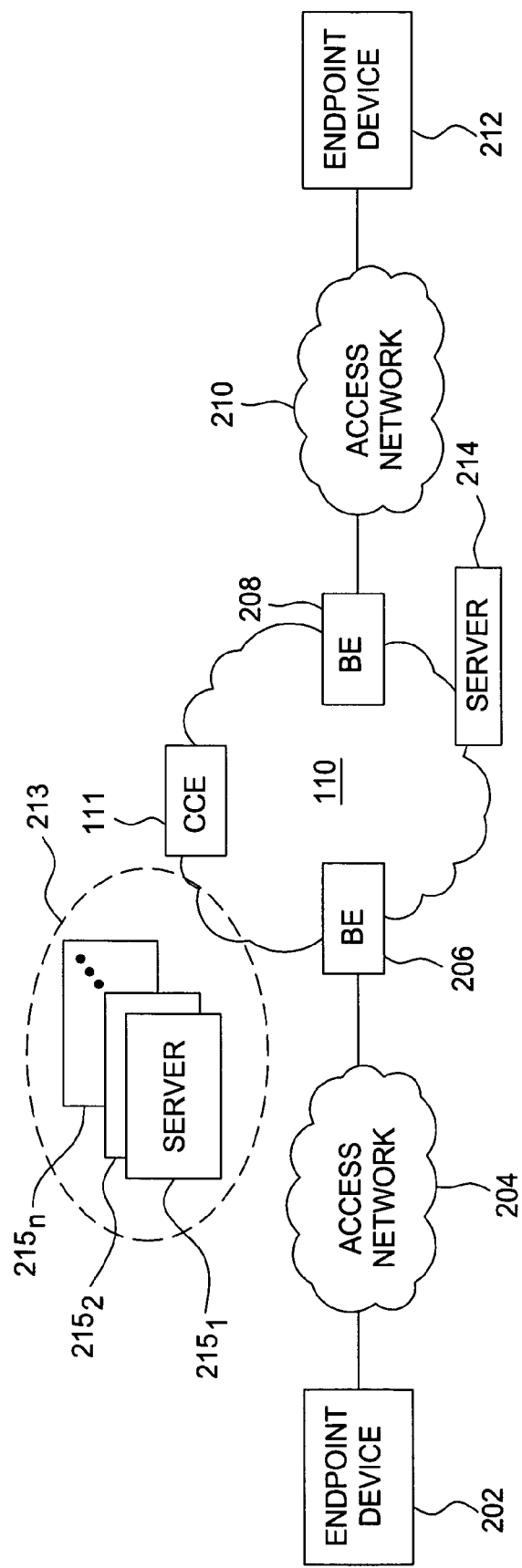
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and at least one border element (BE) 206. An endpoint device 212 is configured for communication with the core network 110 via an access network 210 and at least one BE 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc). The core network 110 further includes a server farm 213 that comprises a plurality of servers $215_{1 \ldots n}$ that is situated at a common location. In another embodiment, the server group may be arranged on a hardware chassis. The servers $215_{1 \ldots n}$ in the server farm 213 may comprise application servers, media servers, routing engines, and the like. The core network 110 also includes an application server 214 which is responsible for providing configuration instructions to the server farm 213. Notably, the network provider may utilize a web portal (or other access mechanism) supported by the application server to issue configuration commands to the server farm.

In one embodiment of the present invention, a network service provider hosts a server farm 213 that comprises a plurality of commonly located servers $215_{1 \ldots n}$. Instead of configuring the servers $215_{1 \ldots n}$ to perform tasks, such as supporting services or applications, in a distributed manner (e.g., wherein all of the servers are equally loaded), the network provider may configure the servers to handle various applications as a function of varying requirements. These requirements may be based on factors such as client specific demands, processing resource requirements of a particular application, and the like. Network functions (e.g., applications and services) typically supported by a server farm may include, but are not limited to, voice mail services, network announcements, conferencing applications, and call setup services.

In an exemplary scenario, the network provider may select (e.g., via the application server 214) one server $215_1$ from the server farm 213 to function as a "quasi-dedicated" server for supporting a high availability application, e.g., an application that a customer requires to be immediately accessible at any given time. For example, the network provider may designate a server $215_1$ to process at least one telephony conferencing application that is frequently used by a subscribing enterprise customer. In one embodiment, the network provider may configure (e.g., via the application server 214) the server $215_1$ to allot 85% of its processing resources to handle at least one conference bridge application. By designating and reserving a predefined amount of the server's processing resources to the high availability application, the network provider may ensure that subscribing customer is able to access the desired conferencing application with a guaranteed level of reliability without any delay. This configuration ensures that a conferencing application will perform efficiently when accessed, albeit at the expense of network resources (e.g., 85% of the server would be idle if the server $215_1$ does not receive any conference bridge requests).

Notably, the remaining 15% of the server's processing resources may be assigned to assist the remaining servers $215_{2...n}$ in the server farm 213 that are configured to handle less demanding processes (i.e., the 15% of the processing resources of server $215_1$ is a portion of the cumulative server farm 213 "processing resource pool" that is distributed to support other network functions). For example, the remaining servers $215_{2...n}$ may share operational and network management support tasks in a distributed manner (e.g., the servers alternate the processing of tasks). Although 15% of the processing resources are designated to assist with these distributed support functions, the selected server $215_1$ may still utilize this remaining portion of processing resources to handle conferencing applications in certain situations as needed. In one embodiment, the remaining servers $215_{2...n}$ may still be configured to help the selected server $215_1$ process conferencing application requests in a distributed manner.

In another embodiment, a server $215_1$ may be selected from a server farm 213 to primarily handle the call setup services for 911 calls. Notably, the network provider may designate (e.g., via the application server 214) 90% of the server's processing resources to support the handling of incoming 911 calls due to the high availability requirements of the 911 service (i.e., 911 calls may be characterized by both their important nature and high volume). Consequently, the remaining 10% of the processing resources may be utilized to assist the remaining servers at the server farm for providing common operations and network management support, unless otherwise needed. For example, an endpoint device 202 may initiate a 911 call that is intended for a 911 call center (e.g., endpoint device 212). The call is ultimately handled by the "quasi-dedicated" server $215_1$ located in server farm 213. In the event the server farm 213 is experiencing a high demand for other services or applications, there is a possibility that all of the servers in the server farm 213 are saturated. Notably, this condition would normally compromise the service quality of most, if not all, of the services and applications supported by the server farm 213. However, since only 10% of the server $215_1$ is allowed to perform other functions, successful servicing of critical 911 calls is ensured by using the dedicated 90% allotment of the server's processing resources. Thus, the present invention may effectively guarantee a certain level of reliability for at least one high availability service or application.

Figure 3:
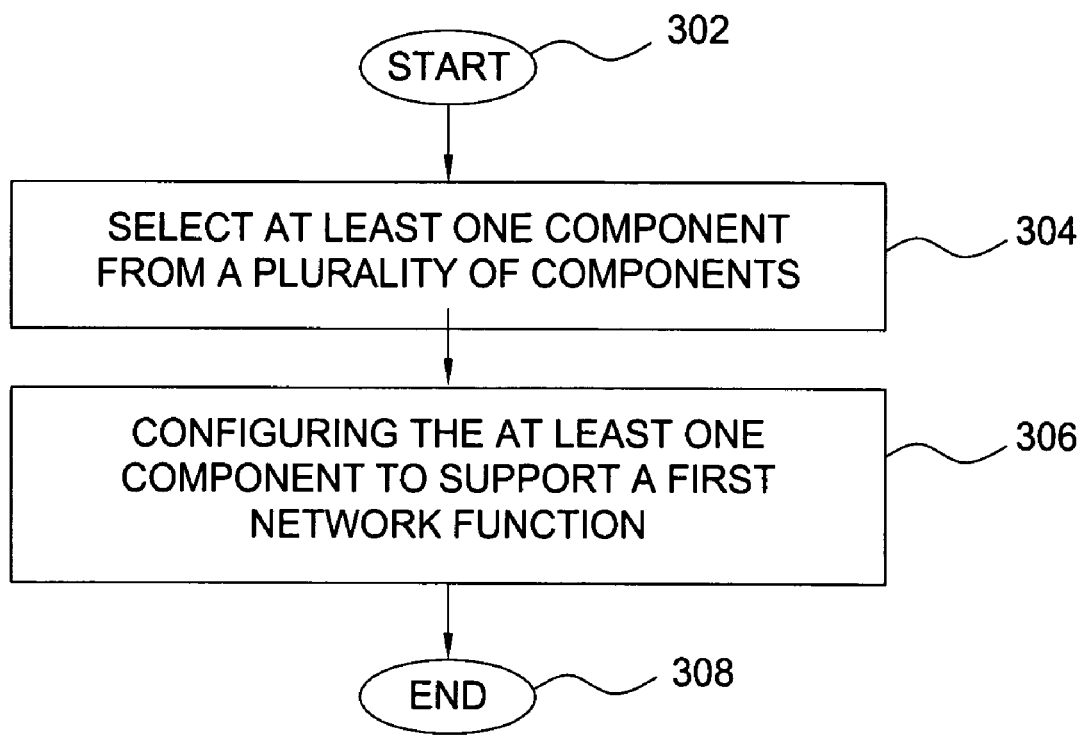
FIG. 3 is a flow diagram depicting an exemplary embodiment of a method for configuring a component in accordance with one or more aspects of the invention.

FIG. 3 is a flow diagram depicting an exemplary embodiment of a method 300 for configuring a component in a communications network as related to one or more aspects of the invention. The method 300 begins at step 302 and proceeds to step 304 where the at least one component is selected from a plurality of network components. In one embodiment, a network provider utilizes an application server 214 to select a server $215_1$ from a plurality of servers $215_{2...n}$ commonly located at a server farm 213.

At step 306, the at least one component is configured to predominantly support a first network function that is a high availability function. Similarly, the at least one component is configured to support at least a second network function with only a limited portion of its total processing resources. In one embodiment, the server 214 configures the server $215_1$ selected in step 304 to support a high availability application or service, such as a conferencing application, instead of supporting other network functions (e.g., operational and network management support functions) in a distributed manner as in the case with the remaining servers $215_{2...n}$ at the service farm 213. Alternatively, the selected server may be configured to support a call setup service for 911 calls. The server $215_1$ may be configured (via the application server 214) by allotting a high percentage of processing resources to support the high availability application or service, while a small percentage of processing resources allowed to support general operational and network management support functions. The method 300 continues to step 308 and ends.

Figure 4:
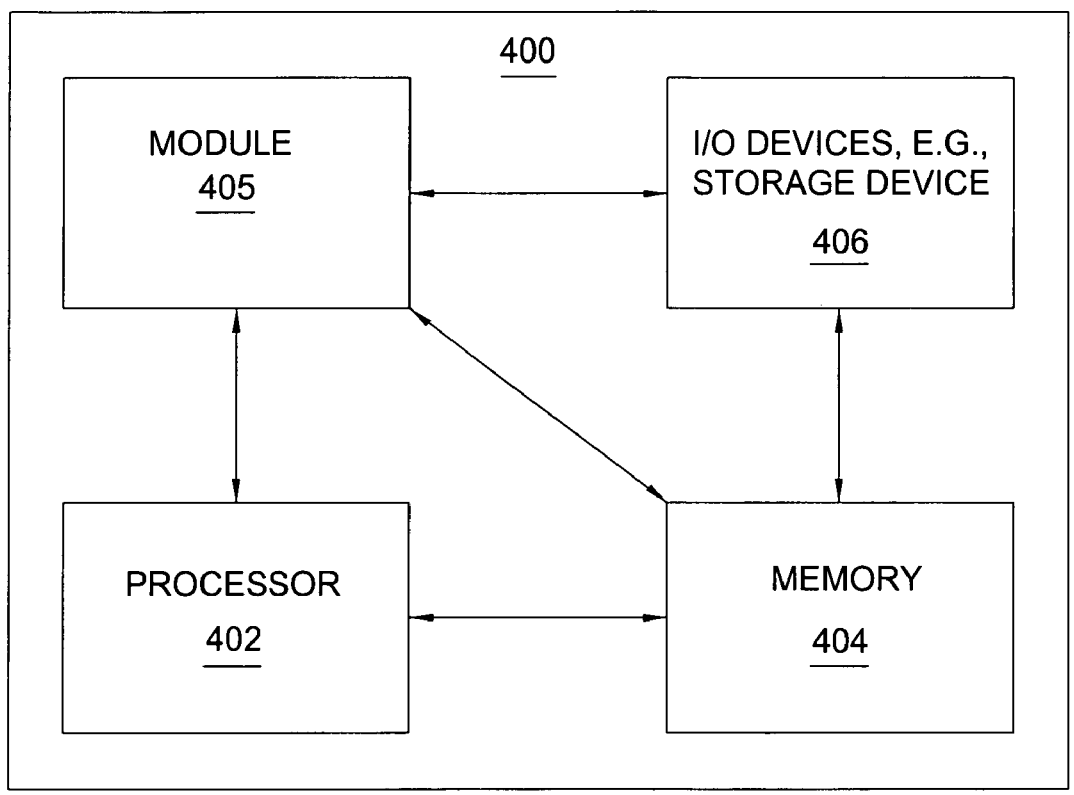
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for configuring a component, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for configuring a component can be loaded into memory 404 and executed by processor 402 to implement the functions as discussed above. As such, the present module or process 405 for configuring a component (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for configuring at least one component of a plurality of components in a communications network, comprising:
   selecting said at least one component from said plurality of components, wherein said plurality of components is situated at a common location;
   configuring a high percentage of processing resources of said at least one component to support a first high availability network function; and
   configuring a low percentage of said processing resources of said at least one component to support at least one second network function that is commonly supported in a distributed manner with a remainder of said plurality of components, wherein a sum of said high percentage and low percentage of said processing resources comprises an entire amount of said processing resources.

2. The method of claim 1, wherein said communications network comprises an Internet Protocol (IP) network.

3. The method of claim 2, wherein the IP network comprises at least one of: a Voice over IP (VoIP) network or a Service over IP (SoIP) network.

4. The method of claim 1, wherein said at least one component comprises at least one of: an application server, a media server, or a routing engine.

5. The method of claim 1, wherein said common location comprises a server farm.

6. The method of claim 1, wherein said first high availability network function comprises at least one of: a service or an application.

7. The method of claim 1, wherein each of said first high availability network function and said at least one second network function comprises at least one of: a voice mail service, a network announcement, a conferencing application, or a call setup service.

8. A computer-readable medium having stored thereon a plurality of instructions, the plurality of instructions including instructions which, when executed by a processor, causes the processor to perform the steps of a method for configuring at least one component of a plurality of components in a communications network, comprising:

selecting said at least one component from said plurality of components, wherein said plurality of components is situated at a common location;

configuring a high percentage of processing resources of said at least one component to support a first high availability network function; and configuring a low percentage of said processing resources of said at least one component to support at least one second network function that is commonly supported in a distributed manner with a remainder of said plurality of components, wherein a sum of said high percentage and low percentage of said processing resources comprises an entire amount of said processing resources.

9. The computer-readable medium of claim 8, wherein said communications network comprises an Internet Protocol (IP) network.

10. The computer-readable medium of claim 9, wherein the IP network comprises at least one of: a Voice over IP (VoIP) network or a Service over IP (SoIP) network.

11. The computer-readable medium of claim 8, wherein said at least one component comprises at least one of: an application server, a media server, or a routing engine.

12. The computer-readable medium of claim 8, wherein said common location comprises a server farm.

13. The computer-readable medium of claim 8, wherein said first high availability network function comprises at least one of: a service or an application.

14. The computer-readable medium of claim 8, wherein each of said first high availability network function and said at least one second network function comprises at least one of: a voice mail service, a network announcement, a conferencing application, or a call setup service.

15. An apparatus method for configuring at least one component of a plurality of components in a communications network, comprising:

means for selecting said at least one component from said plurality of components, wherein said plurality of components is situated at a common location;

means for configuring a high percentage of processing resources of said at least one component to support a first high availability network function; and means for configuring a low percentage of said processing resources of said at least one component to support at least one second network function that is commonly supported in a distributed manner with a remainder of said plurality of components, wherein a sum of said high percentage and low percentage of said processing resources comprises an entire amount of said processing resources.

16. The apparatus of claim 15, wherein said communications network comprises an Internet Protocol (IP) network.

17. The apparatus of claim 16, wherein the IP network comprises at least one of: a Voice over IP (VoIP) network or a Service over IP (SOIP) network.

18. The apparatus of claim 15, wherein said at least one component comprises at least one of: an application server, a media server, or a routing engine.

19. The apparatus of claim 15, wherein said common location comprises a server farm.

20. The apparatus of claim 15, wherein each of said first high availability network function and said at least one second network function comprises at least one of: a voice mail service, a network announcement, a conferencing application, or a call setup service.

\* \* \* \* \*